United States Patent [19]
Blanchet

[11] 3,968,323
[45] July 6, 1976

[54] CLAMP WITH GROUNDING MEANS FOR HOLDING CONDUCTORS BETWEEN PARALLEL SUPPORT RAILS

[75] Inventor: Lucien Blanchet, Le-Vesinet, France
[73] Assignee: Elhyco AG, Glarus, Switzerland
[22] Filed: Jan. 31, 1975
[21] Appl. No.: 546,181

[30] Foreign Application Priority Data
Feb. 5, 1974  France .............................. 74.03861

[52] U.S. Cl. ............................ 174/135; 248/68 CB; 339/198 GA
[51] Int. Cl.² ........................ H01R 3/04; F16L 3/10
[58] Field of Search ............... 174/40 CC, 135, 155, 174/156, 157; 248/67.5, 68 CB, 73; 339/198 GA

[56] References Cited
UNITED STATES PATENTS
2,417,260  3/1947  Morehouse ....................... 174/135
3,087,009  4/1963  Blanchet ........................... 174/135

FOREIGN PATENTS OR APPLICATIONS
703,536  2/1968  Belgium ............................ 174/135

Primary Examiner—Laramie E. Askin
Attorney, Agent, or Firm—Brisebois & Kruger

[57] ABSTRACT

Assembly comprises two parallel channel-shaped rails and pairs of jaws between the rails for gripping conductors extending transversely of the rails. Sides of one rail have external projections and the bottom of one jaw of each pair is also channel-shaped with its sides recessed to receive said projections with substantial tolerance. A spring is positioned between the channel-shaped bottom of the jaw and the mating rail which takes up the play due to the tolerance and electrically connects a grounding strip on the jaw to the rail.

6 Claims, 7 Drawing Figures

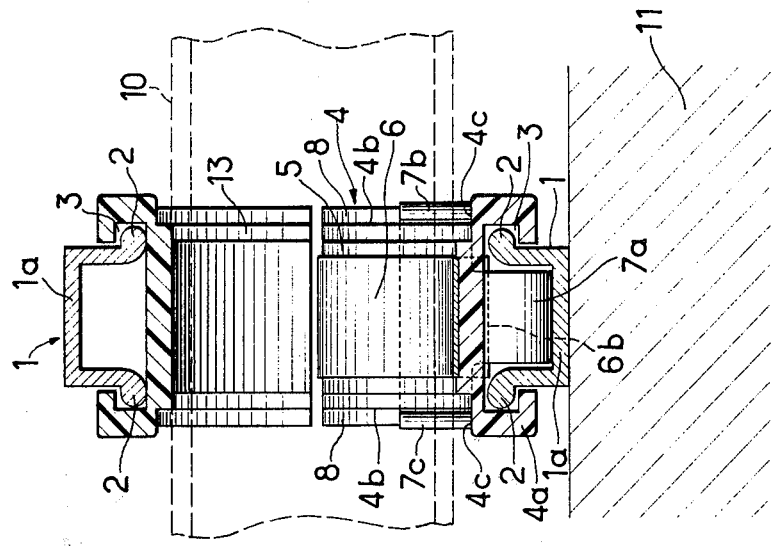
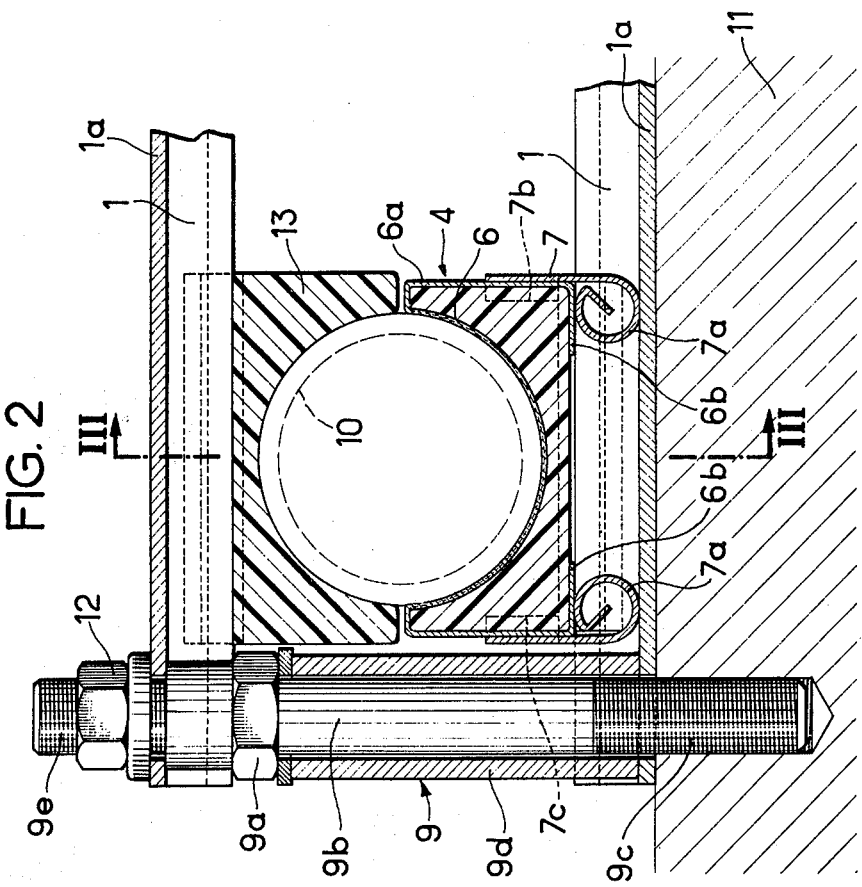

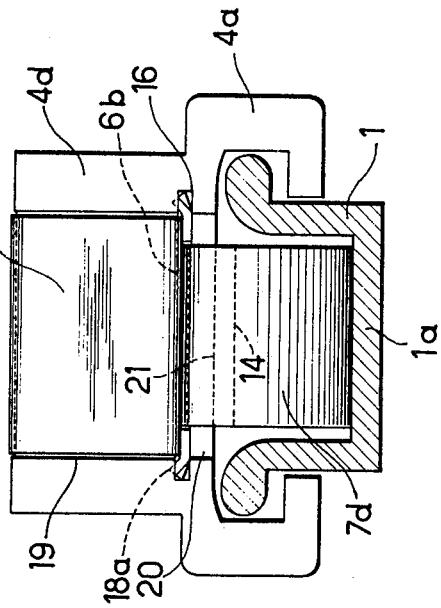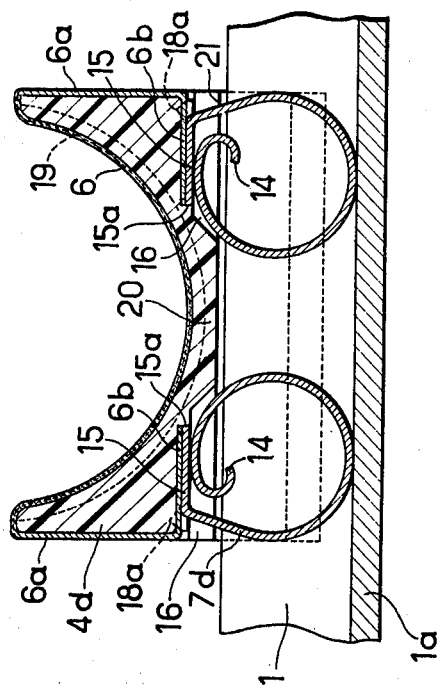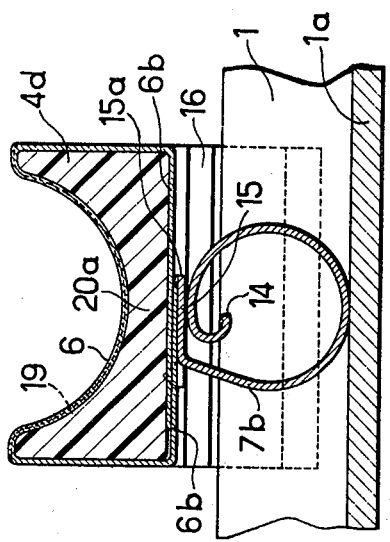

CLAMP WITH GROUNDING MEANS FOR HOLDING CONDUCTORS BETWEEN PARALLEL SUPPORT RAILS

SUMMARY OF THE INVENTION

In connection with terminals for ducts or sheaths for electrical conductors, which terminals comprise symmetrical jaws which can be juxtaposed in pairs between two parallel assembly rails and clamps at the ends of the rails serving to immobilize said ducts with respect to said rails and jaws, it is conventional to provide metallic grounding strips for the ducts connecting them to ground through said parallel rails to bring about the simultaneous grounding of both rails and ducts.

However, the conventionally used grounding strips, which exactly follow the inner wall of half the jaws of the juxtaposed pairs, normally extend from one to the other of the two above-mentioned clamps, making disassembly followed by reassembly or the replacement of the corresponding grounding strip necessary whenever it is desired, for example, to replace one duct by a duct of a different diameter.

Moreover, the necessity of supporting over their entire length the said grounding strips, whose thickness is very small and which are therefore very fragile, makes it necessary to arrange the said jaws contiguously.

Furthermore, when these jaws are to be mounted, for example, on external rounded connecting members of the two parallel assembly rails, the existence of a single grounding strip represents the only real obstacle to the individual disassembly of the jaws equipped with the said strip, because it is always necessary to disassemble the end clamps to free the said strip.

The present invention obviates this disadvantage and has for its object a device for attaching grounding strips of limited length having their median portions immobilized within grooves provided on each of the jaws mounted on one of the two parallel rails, whereby the said attaching device ensures an electric connection between the ends of these individual strips and the median portion of the assembly rails whereon the said jaws are mounted.

The invention also relates to jaws equipped with at least one grounding strip attaching device.

An important characteristic of the present invention is that the lower parts of the strip attaching devices ensuring the said electrical connection between the median portion of the rail and the ends of each individual strip comprise a spring of substantially cylindrical configuration permitting, on the one hand, an elastic suspension of said ducts, and on the other hand, compensation for the dimensional tolerances of these ducts, rails and jaws.

Such an elastic suspension permits both the easy sliding of the said jaws on the assembly rails with a view to positioning them at any random point in alignment with the corresponding duct without having to exert significant force to bring about the compression of the said springs, and an easy sliding of the said ducts relative to the corresponding jaws in the event of possible expansion of the ducts.

Another significant characteristic of the new device is that, due to the limited length of the said grounding strips which this device makes it possible to use, it is possible to make these strips from a metal such as cadmium-coated aluminum, for example, which occupies a position in the electromotive series very close to that of the metal forming said ducts.

As a result of the possibility of using such a metal, it is possible to limit electrolytic corrosion in a humid atmosphere to a much greater extent than would be the case with grounding strips made from a single metal extending over almost the entire assembly rail up to the two end clamps which immobilize the said ducts.

In another embodiment of the said grounding strip attaching device, the latter can be clipped to at least one side of the corresponding jaw, which is provided with slots forming shoulders for cooperating either with two members of different types when clipping only takes place on one side of the corresponding assembly rail, or two similar members forming attaching clips.

In another embodiment of the new device, the said springs are simply introduced into slots provided in the lower part of the said jaws and comprise means permitting the immobilization of said springs in the said slots in cooperation with other means provided on the said lower part.

A fair-sized gap is provided for receiving the sides of the rail so that the assembly of the jaws involves no significant compression of the lower springs of te above-described devices.

However, these springs are compressed when an attempt is made to move the corresponding jaws of each duct closer together by acting on the end clamps.

The gap left between the upper portion of the sides of the rail and the upper wall of the slots provided for housing the same permits a variable compression as a function of the dimensional tolerances of the various ducts and the said jaws.

As a result of the elastic suspension of the said ducts, friction between the jaws and ducts is maintained at a substantially constant value which limits wear due to any possible sliding of the ducts in the jaws provided for ensuring their immobilization, due to expansion of the said ducts.

The characteristics of the present invention will be better understood from reading the following description of three embodiments of the jaw equipped with at least one strip attaching device according to the invention, which embodiments are given solely by way of example, and are described with reference to the accompanying drawings, in which:

FIG. 2 is a vertical sectional view of a terminal strip showing two parallel rails, carrying two symmetrical jaws located adjacent to one of the end clamps;

FIG. 3 is a sectional view taken along the line III—III of FIG. 2;

FIG. 5 is a median longitudinal sectional view taken through the rail, jaw, and two attaching devices of the type illustrated in FIG. 4;

Figure 4:
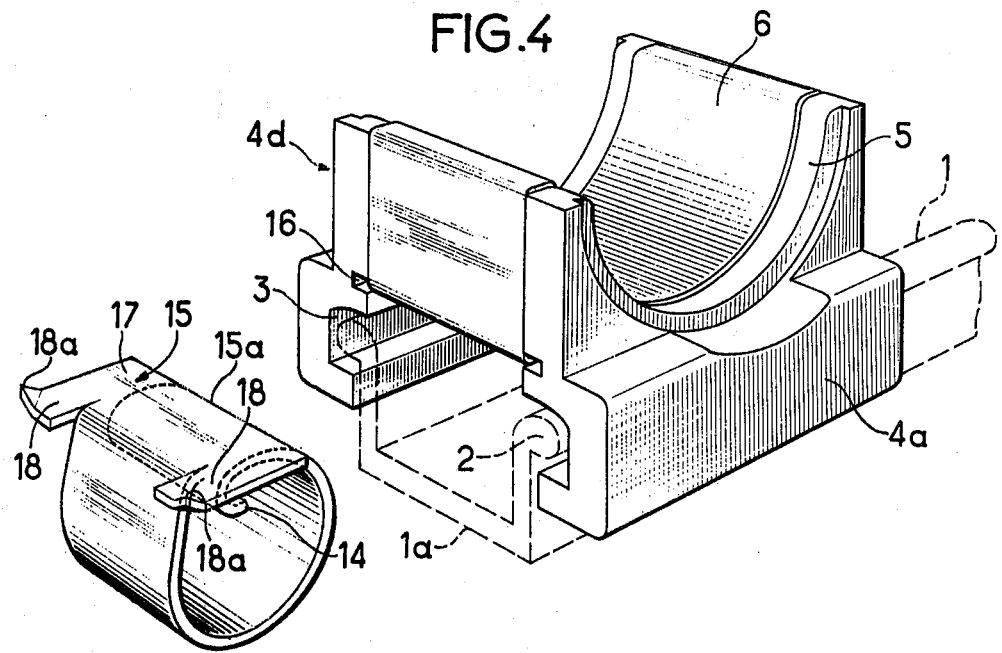
FIG. 4 is an exploded perspective view of a jaw mounted on an assembly rail and equipped with a short grounding strip utilizing a second embodiment of the attaching device according to the invention, and showing one of the slots provided in the lower portion of the said jaw for cooperating with this second type of device.

FIG. 6 is an elevational view of one end of the jaw of FIG. 4 equipped with a device of the above-indicated type; and FIG. 7 is a longitudinal median sectional view taken through a jaw for a smaller diameter cable than one intended to cooperate with the jaw of FIG. 5 and permitting the use of a single attaching device of the type hereinbefore described, mounted on the median portion of the said jaw.

Figure 1:
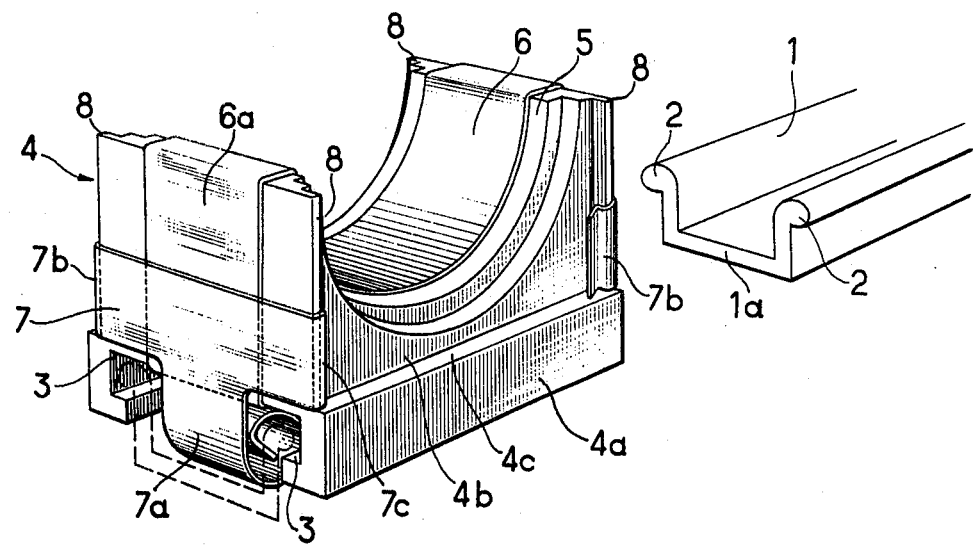
FIG. 1 is an exploded perspective view of a lower jaw for receiving a duct and adapted to be slidably mounted on an assembly rail.

FIG. 1 shows an assembly rail 1 with two outer rounded projections 2 adapted to slide in slots 3 provided in the lower portion 4a of a jaw 4. These jaws have in their inner walls 5 a groove for housing a grounding strip 6 bent at 6a over the front end walls of each jaw 4 and then underneath the upper portion of the base 4a of jaw 4, as can be particularly seen in FIGS. 2 and 3.

One of the fasteners for the said strip is shown at 7 and comprises a downwardly projecting spring 7a which is also visible in FIGS. 2 and 3.

The housing groove for strip 6, the depth of which is less than the thickness of the said strip, prevents any movement of the latter due to sliding of the corresponding duct within the said jaws, while ensuring an excellent electrical contact between the said strip 6 and the wall of the said duct. The grounding strip 6 may be stuck to that portion of the wall of the jaw forming the bottom of the housing groove receiving the grounding strip by means of an appropriate adhesive.

The members 7 may have two ends 7b forming attaching clips and adapted to cooperate with flanges 8 on jaws 4 which have a reduced thickness.

However, it is also possible to provide only a single attaching clip on one of the longitudinal sides of the jaw 4 and to provide on the opposite side a channel 7c for receiving the whole flange 8 of the jaw 4.

The members 7 are then attached by engaging one of the flanges 8 in the above channel 7c and exerting pressure on the said member 7 beside the attaching clip 7b provided on the other side of member 7.

It can be seen that base 4a projects relative to the front walls 4b of jaw 4 in such a way that the base of clip 7b rests entirely on the horizontal wall 4c of base 4a.

If reference is now made to FIGS. 2 and 3, it can be seen that the rounded projections 2 are located with a certain tolerance within slots 3 so that this tolerance is distributed on either side of the said projections.

As indicated hereinbefore, the gap provided in the lower portion of the jaw makes it possible to mount the jaw 4 on assembly rail 1 without having to compress spring 7a. It is only through acting on the end clamp 9 that compression occurs, and the gap provided above projections 2 compensates for the dimensional tolerances of the ducts, jaws and assembly rails by bringing about simultaneously an elastic suspension of ducts 10.

It should be noted that the lower portions 4a of base 4 can be rounded without any sharp angle so as to permit a simple attachment of the jaws to rail 1, provided that a material with an appropriate elasticity is used for making these jaws.

An electrical connection between the grounding strip 6 and the assembly rail 1 occurs through the upper portion of spring 7a which is pressed against the end 6b of strip 6, whereby the compression of the springs ensures an electrical connection of appropriate type between the said strip and the said rail.

Moreover, it should be noted that the spring members 7 are in contact with strip 6 over a considerable surface area level with the upper portion of the said members which further decreases the electrical resistance between strip 6 and the median portion 1a of rail 1.

The end clamp 9 shown in FIG. 2 comprises a bolt 9b having in its upper portion an area of larger diameter 9a in the form of a hexagonal head and threaded at its lower end 9c.

This hexagonal head permits the attachment of the median lower portion 1a of lower rail 1, for example, to a structure 11 provided with an internally threaded hole mating with the threaded end 9c of the bolt.

The bolt is encircled by a tubular member 9d forming a spacer and which is supported on the median portion 1a of lower rail 1.

The bolt 9b also has an upper threaded portion 9e which can cooperate with a nut 12 supported on the upper median portion 1a of upper rail 1 when the nut 12 is tightened to ensure the fastening of the different ducts 10 between the rails.

The degree of compression of spring 7a compensates, as hereinbefore indicated, for the diameter tolerances of the corresponding ducts, as well as in the dimensions of the jaws and rails. It also permits the sliding of the duct in question between the said jaws or, more precisely, between the grounding strip of the lower jaw and the inner wall, which is preferably smooth, of an upper jaw 13 having neither a groove for housing the grounding strip nor a flange for mounting the above-mentioned strip attaching means.

FIG. 2 shows that the upper jaw 13 is slightly longer than the lower jaw 4.

In the embodiment shown in FIGS. 4–7, the spring used as the strip attaching means is replaced by a spring 7d which can be housed underneath the part 6b of the said grounding strip the ends of which are bent parallel to the assembly rail beneath the central portion of a jaw 4d of a slightly different type from the jaw 4 in FIGS. 1–3.

The configuration of these springs 7d is similar to that of the lower portion 7a of member 7, but they do not extend upward along the front surfaces of the jaw, so that one section of the metal constituting the said springs 7d extends parallel to the said rail above its other end 14. The section visible at 15 in FIG. 4 has a widened portion 17 which abuts, at least on either side of the portion 6b of the grounding strip, the upper wall of slot 16 in the said jaw.

This widened portion 17 extends rearwardly forming two horizontal tabs 18, the external corners of which are bent in the direction of the upper wall of the said slot 16 and which can be positioned on either side of the end 6b of strip 6.

These tabs 18 form a spring and the said outer corners 18a, which are in practice compressed inside slot 16 when springs 7d are compressed, serve to frictionally immobilize these springs. As a result of the above-indicated outward bending, limited to the said outer corners, tabs 18 cannot damage the grounding strip 6.

However, the corners 18a of the said portions 18 frictionally engage the plastic material forming jaw 4d to form brakes which prevent any possibility that the said springs 7d may slip out after they have been inserted in the position shown in FIG. 5 in which the front edges 15a of the bent portion 15 abut against the symmetrical shoulders provided for this purpose in jaw 4d.

When springs 7d are compressed, they are therefore immobilized within slot 16 both by means of the said bent corners 18a and by means of the edges 15a of their ends 15.

FIGS. 5–7 also show the groove for housing strip 6, the base of which is represented by broken lines 19.

Springs 7d function in exactly the same way as springs 7a except that these springs only bring about an electrical connection with the bent ends 6b of strip 6, whereas in the other embodiment the springs are also in contact with portion 6a of the said strip.

Other than with respect to this question of electrical connection, springs 7d bring about the same advantages as springs 7a with respect to the elastic suspension of the ducts and the frictional wear of these ducts in the case of possible sliding in the jaws and bringing about their immobilization in the event of expansion of the said ducts.

In the embodiment shown in FIG. 7 the two bent ends 6b of strip 6 overlap in the median portion of jaw 4d and are both held in place by the same spring 7d.

Edge 15a of this spring, level with widened portion 17, abuts symmetrical posts 20a, whereof one is visible in FIG. 7, and which are separated from one another in such a way as to permit the passage of the bent end 6b of strip 6.

In the same way as in the case of FIG. 5, corners 18a, by rubbing against the upper wall of slot 16 of jaw 4d when spring 7d is compressed, prevent the retraction of this spring, which is also immobilized against movement to the right at the same level by the two outer portions of edge 15a which abut against the two posts 20a.

The central portion 20 shown in FIG. 5, although located to the rear of spring 7d in FIG. 6, is still visible in this drawing on either side of the said spring and descends to a level 21, shown in dotted lines in FIG. 6, which is very close to the upper portion 2 of rail 1 whose median portion is shown at 1a in FIGS. 5–7.

Thus, while portion 20 occupies the whole width of the jaw, posts 20a only exist at the level of the widened portion 17 of spring 7d, thus permitting the two ends 6b of strip 6 to overlap.

What is claimed is:

1. In an assembly comprising a pair of channel-shaped parallel rails and at least one pair of opposed jaws made of an insulating material and located between said rails to hold elongated members in a position extending transversely with respect to said rails, said jaws having gripping surfaces for engaging said elongated members, and said rails having external projections on their sides cooperating with longitudinal retaining means on the jaws, and each jaw engaging a selected one of said rails having a channel facing said one rail, the improvement according to which the sides of each channel in a jaw define inner slots receiving said projections with a significant tolerance, and the gripping surface of one jaw of each pair of opposed jaws is provided with a metal grounding strip in electrical contact at at least one end with at least one metal member ensuring an electrical connection between said grounding strip and said one rail, said metal member having a portion which forms a generally cylindrical spring compressed between the bottom of said one rail and the bottom of the channel in said one jaw to ensure the elastic suspension of the said jaws relative to said one rail after mounting of the said elongated members.

2. Assembly according to claim 1, wherein the metal member has a flat portion projecting from the said cylindrical spring and engaging a portion of the said grounding strip bent over a surface of the jaw carrying said strip perpendicular to the bottoms of said rails, and wherein the edge of said flat portion carries at least one lateral clip which fits over a flange of the said perpendicular surface.

3. Assembly according to claim 1, wherein the said grounding strip is made from a metal occupying a position in the electromotive series very close to that of a metal used in sheathing said elongated members.

4. An assembly according to claim 1, wherein said tolerance is provided on both sides of said projections and selected to permit an adequate compression of the said springs to ensure a good electrical connection between elongated members and the assembly rail, while permitting any sliding of the elongated members due to expansion or vibration without damage to the elongated members or to the jaws cooperating with them.

5. An assembly according to claim 1, wherein each grounding strip is stuck to the wall of its jaw by means of an appropriate adhesive.

6. An assembly according to claim 1, wherein each spring has at one end parallel to the corresponding rail a portion of increased width which abuts against at least one shoulder in the wall of a slot receiving the external projection from the corresponding rail, the rear of said portion forming two tabs whose outer corners are sufficiently spaced relative to one another to permit their location on either side of the ends of said grounding strip and bent in such a way as to cooperate by friction with the said wall in order to immobilize the corresponding spring during the mounting of said elongated members.

* * * * *